(12) United States Patent
Almási et al.

(10) Patent No.: US 8,792,522 B2
(45) Date of Patent: Jul. 29, 2014

(54) METHOD AND APPARATUS FOR SYNCHRONIZED STARTING OF SOFT X-RAY LASERS

(75) Inventors: Gábor Almási, Kozármisleny (HU); Mátyás Kiss, Komló (HU); Szergej Kuhlevszkij, Pécs (HU); Imre Sánta, Pécs (HU); Sándor Szatmári, Szeged (HU); János Szász, Pécs (HU)

(73) Assignee: Pécsi Tudományegyetem, Pécs (HU)

( * ) Notice: Subject to any disclaimer, the term of this patent is extended or adjusted under 35 U.S.C. 154(b) by 42 days.

(21) Appl. No.: 13/809,637

(22) PCT Filed: Jul. 13, 2011

(86) PCT No.: PCT/HU2011/000069
§ 371 (c)(1),
(2), (4) Date: Mar. 8, 2013

(87) PCT Pub. No.: WO2012/007778
PCT Pub. Date: Jan. 19, 2012

(65) Prior Publication Data
US 2013/0215913 A1    Aug. 22, 2013

(30) Foreign Application Priority Data
Jul. 14, 2010   (HU) .................................. P 1000368

(51) Int. Cl.
*H01S 3/30*    (2006.01)
(52) U.S. Cl.
USPC ................ 372/5; 372/29.011; 372/29.012; 372/38.04; 372/38.06; 372/82

(58) Field of Classification Search
USPC ........ 372/5, 29.011, 29.012, 38.04, 38.06, 82
See application file for complete search history.

(56) References Cited

U.S. PATENT DOCUMENTS 3,398,322 A * 8/1968 Guenther ...................... 315/150
(Continued)

OTHER PUBLICATIONS

Tomassetti et al.: "Capillary discharge soft X-ray lasing in Ne-like Ar pumped by long current pulses", Eur. Phys. J. D., 2002, vol. 19, pp. 73-77.

(Continued)

*Primary Examiner* — Kinam Park
(74) *Attorney, Agent, or Firm* — Jason D. Voight

(57) ABSTRACT

The invention can be used for setting up high energy and high average power soft x-ray laser equipments. The apparatus of the present invention is provided with a capillary discharge, wherein the spark gap (3) is disposed in water and breakdown of the spark gap (3) is triggered and synchronized by a laser source (16). In order to complete the synchronizing step the apparatus comprises a transformer (12) for monitoring and controlling the decrease of the charging current of the generator, preferably a Marx generator (7), and a triggering circuit (14). The time dependent control of the laser source (16) generating the breakdown of the spark gap (3) is achieved by the triggering circuit (14).

9 Claims, 2 Drawing Sheets

(56) References Cited

U.S. PATENT DOCUMENTS

Figure 1:
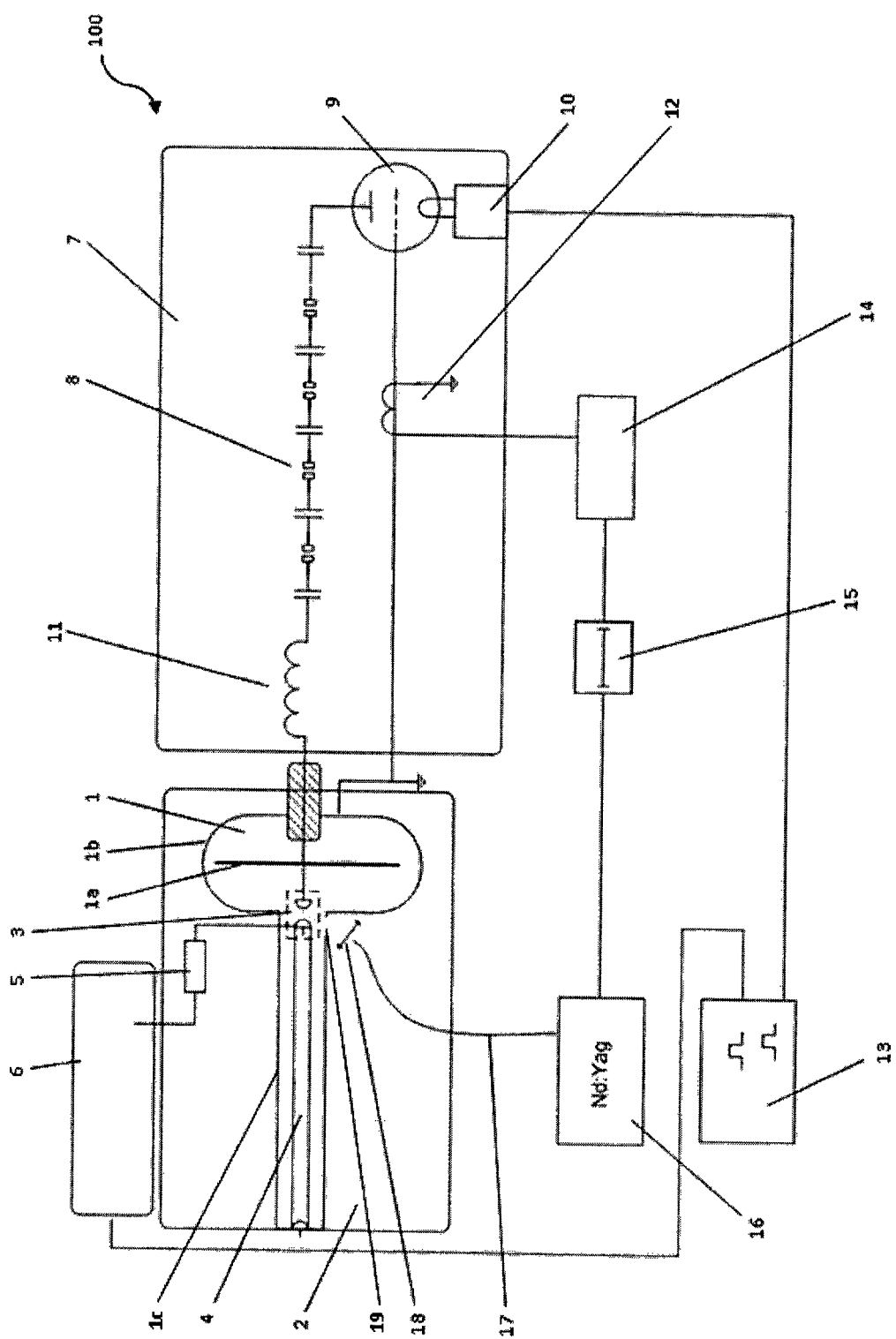

| | | | |
|---|---|---|---|
| 5,317,574 A * | 5/1994 | Wang | 372/5 |
| 6,167,065 A | 12/2000 | Rocca | |
| 2006/0262825 A1 * | 11/2006 | Rocca | 372/55 |

OTHER PUBLICATIONS

Woodworth et al.: "170-kV Laser-Triggered Water Switch Experiments", IEEE Transactions on Plasma Science, 2005, vol. 33, No. 6, pp. 2051-2059.

* cited by examiner

METHOD AND APPARATUS FOR SYNCHRONIZED STARTING OF SOFT X-RAY LASERS

The present invention refers to an apparatus and method for laser-triggered driving of a soft x-ray laser device. In particular, the present invention refers to an apparatus and method in the above technical field in which the coupling of the electrical energy into a capillary discharge is solved by a well synchronized laser triggered spark gap, where the laser radiation is emitted by a laser source with appropriate time control.

The application of the apparatus and method of the present invention is targeted in the first instance to high intensity table top soft x-ray laser sources where the emitted amplified coherent radiation is generated by a capillary discharge plasma (discharge-pumped soft x-ray laser). In the context of the present description under soft x-ray laser sources such light sources are meant, which emit partially coherent electromagnetic radiation in the 0.2-50 nm wavelength spectral region.

Today, for the formation of a plasma containing highly charged ions—necessary for the operation of discharge pumped soft x-ray lasers—the role of a homogeneously pinching plasma generated by very fast discharge pulses in a capillary is gradually increasing. In the relevant technical field these discharges are called Z-pinch or in a particular case capillary Z-pinch. The first experiments about highly amplified soft x-ray radiation generated in a capillary discharge plasma were reported by J. J. Rocca et al (J. J. Rocca, V. Shlyaptsev, F. G. Tomasel, O. D. Cortàzar, D. Hartshorn, and J. L. A. Chilla, Phys. Rev. Lett. 73, 2192 (1994)). The laser process, i.e. large soft x-ray amplification in discharge created plasma was observed in the 3p-3s (J=0-1) transition of neon like Ar ($Ar^{+8}$) at 46.9 nm wavelength. The Ar atoms were excited and ionized by an ultra fast (60 ns) and high current (40 kA) Z-pinch discharge in a plastic capillary. The beam of soft x-ray pulses thus resulted was characterized by an annular intensity profile.

In the course of later developments many effort was devoted to decreasing the size of equipments, decreasing and optimizing the size and arrangement of the energy storage and energy coupling system and developing a well synchronized triggered spark gap instead of spark gaps operating in the spontaneous or self-breakdown mode used earlier. Most updated results can be read in the following publications: A. Ben-Kish, M. Shuker, R. A. Nemirowsky, A. Fisher, A. Ron, and J. L. Schwob, Phys. Rev. Lett., 87, 015002 (2001), G. Niimi, Y. Hayashi, M. Nakajima, M. Watanabe, A. Okino, K. Horioka and E. Hotta, J. Phys. D, 34, 1 (2001) és S. V. Kukhlevsky et al., Eur. Phys. J. D, 19, 73 (2002); S. V. Kukhlevsky et al., Europhys. Lett., 63, 694 (2003); Europhys. Lett., 63, 681 (2003), in patent application WO 2006/127147 and in U.S. Pat. Nos. 6,167,065 and 7,251,263.

In order to achieve coupling of maximum energy into the capillary discharge it is important to guarantee that the breakdown of the spark gap occurs in a well defined point of time, preferably at the time when the energy storing capacitor reaches its peak voltage. If a breakdown arc is not created in the capillary discharge, the energy of the capacitor returns back to the generator where harmful overload, even breakdown may occur. On the other hand, if breakdown happens before achieving the peak voltage the capillary current will be lower than the optimum, resulting in decrease of the laser energy and, as a consequence, decrease of the efficiency of the discharge-pumped soft x-ray laser.

For the above reasons proper adjustment of the spark gap has critical importance.

Due to erosion of the electrodes, however, the system may gradually shift from the optimal range and frequent readjustment might be required. With adjustments or readjustments it cannot be guaranteed in every possible case that the breakdown occurs in the appropriate time.

It is clearly seen that in said technical field there is a need for developing an equipment in which greater part of the energy is coupled from the energy storage capacitor to the capillary in a well controlled and synchronized manner.

In the publication Frolov et al: Experiment CAPEX-U: Present and Future, WDS'05 Proceedings of Contributed Papers, Part II, 357-361, 2005 an equipment according to the preamble of claim 1 is disclosed. In this equipment $SF_6$ or noble gas filled spark gap is employed for initiating a breakdown in a laser triggered capillary.

In the research report of Joseph R. Woodworth et al., Triggering of Water Switches in Terrawatt-Class Pulse Power Accelerators, Sandia National Laboratories Albuquerque, N. Mex. 87185 and Livermore, Calif. 94550, SAND2005-6990, 2005 there is shown a water based spark gap to be used in high energy applications, for instance in high energy terawatt-class power accelerators.

Object of the present invention is to provide a soft x-ray laser with higher efficiency over the existing prior art solutions. This object is achieved by a better synchronization and better time control of the discharge-pumped laser as opposed to the known constructions of the prior art.

Further object of the present invention is to improve energy coupling into the capillary discharge during operation of the above apparatus by optimizing the geometrical arrangement of the energy storage system.

Even further object is to improve safe operation of the apparatus and to guarantee that the breakdown arc is generated in every event, and as a result the energy storage system becomes not overloaded and the possibility for any harmful breakdown endangering personal safety of operating personnel is as low as possible.

The above objects are achieved by an apparatus for laser-triggered driving of a soft x-ray laser, the apparatus containing a generator, such as a Marx-generator, a spark gap, a capillary, an energy storing capacitor having capacitor faces and a laser source being arranged off-axis with the capillary and emitting laser radiation into the spark gap, wherein the spark gap is placed into a fluid environment and the apparatus contains a current transformer for transforming the current supplied by the charged energy storage capacitor to a given measurement range, a triggering circuit for measuring the transformed current and generating a triggering signal for the laser source inducing excess charged particles in the spark gap, a signal delaying unit for delaying the starting signal emitted by the triggering circuit and an optical system for focusing the laser pulses coming from the laser source to at least one point of the spark gap.

Further, the above objects are achieved by a method for laser-triggered driving of a soft x-ray laser, containing the steps of filling an energy storage capacitor with fluid, charging the energy storage capacitor to high voltage with the aid of a generator, such as a Marx-generator, inducing pre-ionization in a spark gap attached to the energy storage capacitor, transforming the charging current of the energy storage capacitor to a given measurement range by means of a current transformer, continuously measuring the transformed current, when a predetermined current value is reached a triggering signal is initiated and transferred to the laser source by predetermined delay, a laser pulse is generated and is transferred into the spark gap so that laser radiation is focused to at least one point of the spark gap.

Further, in frame of the present invention we provide a method in which the laser radiation emitted by the laser source is focused either to one of the electrodes in the spark gap or to a certain point of the fluid filled space between the two electrodes.

Alternatively, the laser radiation emitted by the laser source is focused either to both electrodes in the spark gap or to one of the electrodes and to a certain point of the fluid filled space between the two electrodes. In addition, when the laser beams are focused into two different points of the spark gap, they are applied in the spark gap at the same time or with a predetermined delay with respect to each other to generate carriers.

In the present invention from the viewpoint of processes taking place in the capillary discharge excited plasma and the resulting laser operation it is of high importance that a highest possible ratio of energy is coupled from the outer energy storage system into the capillary. To achieve this goal at a shortest possible period of time, i.e. the rise-time of the system must be minimal. This is achieved with two main features of the present invention.

The first feature consists of obtaining the highest possible characteristic frequency of the apparatus by building up the capillary and the energy storage system as an integral structure, by applying a special arrangement for the energy storage system and by immersing and operating the whole system in water. The energy storage system containing the capillary, the spark gap and the faces of the energy storage capacitor is arranged as a cylindrical waveguide extending symmetrically with respect to the longitudinal axis of the capillary and the symmetry axes of the electrodes in the spark gap, and the length of the waveguide is adjusted to have minimal lengthwise size depending on the voltage to be applied in the apparatus. Dielectric properties of water, such as its relative permittivity at the operating frequency and its high breakdown voltage, make possible to achieve a system with the smallest possible dimensions (i.e. length etc.), and thus to acquire a fastest possible discharge circuit.

The second feature consists in coupling the energy of the energy storage system into the capillary discharge in a synchronized manner, in other words the pre-ionization and the main discharge are triggered. It is necessary, since the main discharge has to be started by the maximum energy state of the energy storage system. In case of the apparatus of the present invention 100 kV voltage and 10-50 kA current pulses—commonly used in the relevant application field— are switched by a spark gap. In the presented embodiment breakdown of the spark gap cannot be performed with the aid of an auxiliary electrode. In order to create a discharge arc, the number of free ions in the medium present between the electrodes—in this case fluid, such as water—needs to be increased by other means. According to the invention one possible way to do induce discharge arc is focusing a laser beam into the spark gap and increasing the density of charged particles. A very important feature of the present invention is that for increasing the number of charged particles the laser radiation may be focused either to one of the electrodes or into a certain point of the fluid filled space between the two electrodes. Alternatively, it can be focused either to the surface of both electrodes or at one of the electrodes and in a certain point of the fluid filled space between the two electrodes. When generation of charged particles takes place in two different points—i.e. either at the surface of both electrodes or at one of the electrodes and in a certain point of the fluid filled space between the two electrodes in the spark gap—then irradiation of the two different points by laser beams may be effected at the same time or with a predetermined delay with respect to each other.

The present invention provides considerable advantages over prior art solutions.

With respect to the solution outlined in Sandia National Laboratories, SANDIA REPORT SAND2005-6990, where a water based spark gap is applied, a much faster rise-time discharge can be created. This is due to the lack of a plasma channel in the present solution. Instead, simply an increase in the ion concentration takes place on the electrode surfaces resulting in a very fast discharge with a rise-rate in the ns range. Due to the simple structure of the apparatus of the present invention excess carriers are generated on the surfaces of the electrodes, no plasma channel is present just excess carriers, and thus the breakdown is initiated as a direct consequence of laser irradiation. The carriers generated on the electrode surfaces may create further excess carriers by secondary processes (VUV light generated by thermal effects), and finally smaller power is sufficient to induce breakdown in the spark gap.

A further advantage is the compact arrangement of the apparatus, i.e. the integral structure of the spark gap and the energy storage system. The compact structure further decreases the rise-time and contrary to the known solutions— where between the water content of the energy storage system and the gas filling of the spark gap insulating connections are always required—no additional connections are needed.

This has a high impact on the performance, since these types of connections may occasionally alter, influence or shift the exact position of the discharge arc in the spark gap (for example the channel of charged carriers ends up somewhere else than on the electrode). Further, there is no need to account for the difference of permittivity between the fluid and the gas, since permittivity is constant throughout the whole structure.

Figure 2:
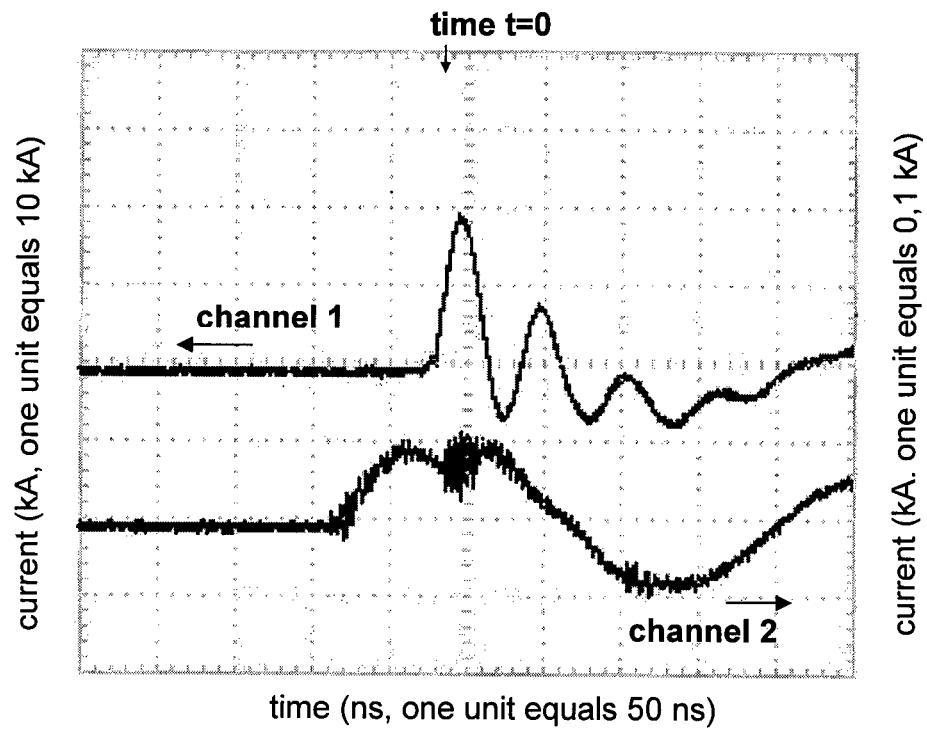
Figure 3:
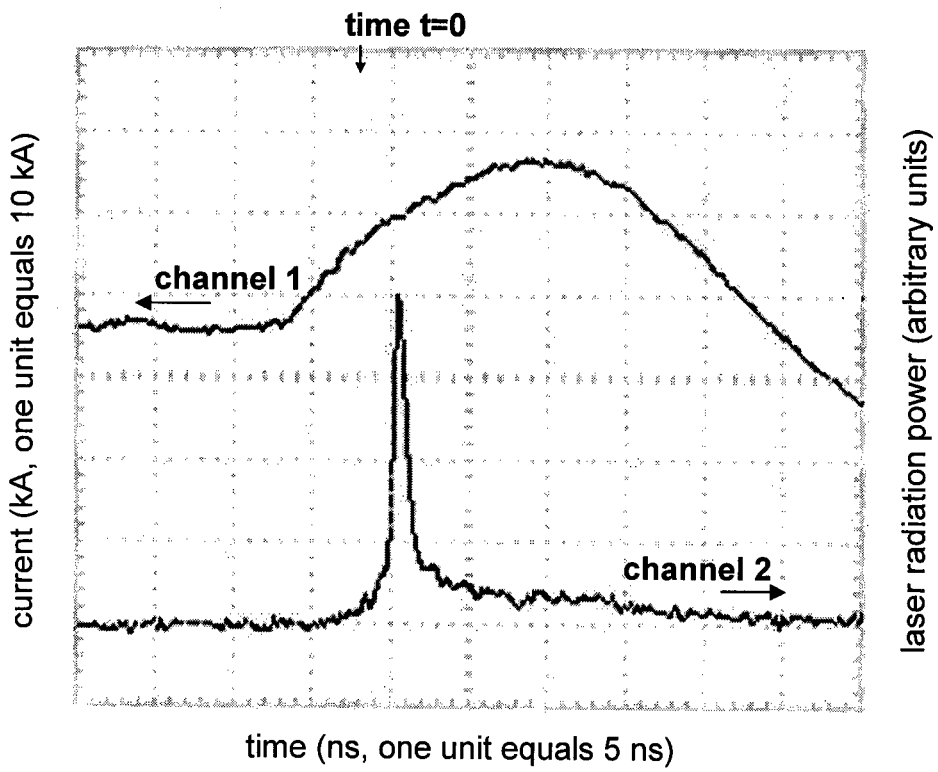

Further advantages and characteristics of the invention will be apparent from the description of a preferred embodiment shown with reference to the attached drawings, where FIG. 1 is a schematic representation of the apparatus of the present invention, in FIG. 2 graphs are shown representing the current of the outer pumping circuit (channel 1) and the current flowing through the capillary in the waveguide system (channel 2) as a function of time, respectively, in FIG. 3 graphs are shown representing the current flowing through the capillary in the waveguide system (channel 1) and the light pulse generated by the discharge (channel 2) as a function of time, respectively.

As shown in FIG. 1 the apparatus (100) of the present invention comprises an energy storing capacitor (1) having capacitor faces (1*a* and 1*b*), a spark gap (3) and a capillary (4). These three elements form in the apparatus (100) a common, integral waveguide system (2). The length of the discharge capillary (4) determines as a primary geometrical parameter the dimensions of the waveguide system (2) and the whole apparatus. The diameter of the capillary (4) is between 1 and 5 mm, its length is in the range of e.g. 0,1-0,9 m. Material of the capillary (4) is chosen preferably among ceramic materials, but it is also feasible to compose the capillary (4) of other material.

The space between faces (1*a*, 1*b*) of the capacitor and the spark gap (3) is filled with a suitable fluid, preferably water. The maximum characteristic frequency of the waveguide system (2)—at which rise-rate of the system has its minimum— is obtained by means of a cylindrical geometrical arrangement. Optimal structure is characterized by a disk shaped inner face (1*a*) of the energy storage capacitor (1) surrounded from outside by a rounded, cylindrical shaped outer face (1*b*), and the outer face (1*b*) of the capacitor (1) has an extended end in the form of a closed, cylindrical channel (1c) circumferentially enclosing the capillary (4). Between the capillary (4) and the channel (1c) the same high permittivity fluid, preferably water is present like the one filled in between the faces (1a, 1b) of the capacitor (1) and in the spark gap (3).

Further component of the apparatus (100) is a charge generator, preferably a Marx-generator (7) commonly used in the technical field having a Marx-bank (8), a triátron (9), a triggering unit (10), an inductive coil (11) and a current transformer (12). The triggering unit (10) of the Marx-generator (7) is connected through a pulse generator (13) to a high voltage pre-ionization pulse generator (6), which is further connected to a pre-ionization ballast resistance (5).

The high voltage pulse generator (6) and the ballast resistance (5) are parts of the pre-ionization circuit. This circuit is useful for inducing pre-ionization of the capillary (4). Pre-ionization can establish the initial conditions for homogeneous pinching of the plasma. Further, the current transformer (12) of the Marx-generator (7) is connected to a laser source (16) with the interconnection of a triggering circuit (14) and a delay unit (15). The radiation of the laser source (16) is transmitted through an optical fiber (17) to the optical system (18) and further from the optical system (18) into the spark gap (3). Parts of the optical system (18) can be accommodated in the water containing parts of either the spark gap (3) or the energy storage capacitor (1).

According to the method of the present invention the Marx-generator (7) charges the faces (1a, 1b) of the capacitor (1) containing water as an insulating medium to high voltage. An inductive coil (11) is interposed between the Marx-generator (7) and the capacitor (1). The capacitor (1) is quickly discharged by means of a low inductivity circuit made up by the water filled spark gap (3) and the capillary (4), and as a result a population inversion is generated in the capillary (4) plasma.

According to the invention the following actions are performed in the electronic excitation system of the capillary discharge in order to effectively induce the laser-aided starting of the spark gap (3). By turning on the Marx-generator (7) charging of the energy storage capacitor (1) of the waveguide system (2) is started. Let assume that the Marx-generator (7) is started at time $t_0$ by means of a pulse generator (13). This $t_0$ is preceded by the ignition of the pre-ionization discharge by the triggering unit (10) of the Marx-generator (7). When operation of the Marx-generator (7) has already started, the charging current is immediately transformed to a predetermined measurement range by means of a current transformer (12) connected to earth potential in the charging circuit, and the transformed current is continuously monitored. Duration of charging is preferably terminated when potential of the capacitor (1) reaches the peak voltage determined by the spark gap (3).

When a predetermined current value is reached the triggering circuit (14) generates a starting signal for the laser source (16). The starting pulse, being transferred through a delay unit (15), induces delayed starting of the active Q-coupled laser source (16) with a time delay according to our choice. Radiation of the laser source (16) is focused directly into the spark gap (3) with the aid of the focusing system (18), where during its travel the laser beam traverses a slot of the energy storing capacitor (1) and a window (19) arranged on the housing of the apparatus (100). Part of the optical system (18) may be placed in water due to the advantageous optical properties of water. For a given geometry of the waveguide system (2) charging requires a well defined period of time to be complete, thus the time delay provided by the delay unit (15) needs to be adjusted only once in order to have the beam of the laser source (16) cause accumulation of charged particles in the spark gap (3) right at the optimal, maximum energy state, in other words at the peak voltage. At this stage breakdown of the spark gap (3) occurs and at the same time capillary discharge can start under optimal conditions.

When laser triggered starting is induced on the side of the spark gap (3) closer to the capillary (4) (anode) the system has a jitter approximately ±20 ns. In contrast, on the side of the spark gap (3) being closer to the face (1b) and in case of an ion channel induced in water between the two electrodes the behavior of the system is similar, and the jitter is about ±10 ns. The value of the jitter is the measure of fluctuations between the time delay of the pulse generated by the triggering circuit (14) and the appearance of the finally emitted soft x-ray pulse in the capillary (4).

In FIGS. 2 and 3 the electric signal shapes of the waveguide system (2) are shown in the event of 4 nF energy storing capacity, 300 kV maximum potential, and 460 mm capillary length. Current measurement was effected with a Rogowski-coil having 20 A/V sensitivity and a dumping element with 30 dB dumping factor. The smallest half-period length achieved was 125 ns.

According to the above explanation the present invention is useful for generating high energy, high mean intensity soft x-ray laser production.

EXAMPLE

A particular embodiment of the above laser triggered, pulse-mode soft x-ray laser source driven by a water based spark gap (3) and based on a capillary discharge has in one possible example the below equipment parameters. Charging of the Marx-generator (7) starts from 20 kV initial voltage. The Marx-generator (7) charges the faces (1a, 1b) of the capacitor (1) which has in the present example 4-6 nF capacity and contains high permittivity water as an insulating medium through an induction coil (11) to a peak voltage between about 200-300 kV. The energy stored in the capacitor (1) lies in the range of 80-100 J. The excitation current in the exemplary embodiment is between 17 kA and 30 kA, its half-cycle duration is 120-180 ns. The main discharge is preceded by a 3 to 6 µs long, 20 A amplitude current pulse, resulting in the pre-ionization of the Ar gas contained in the capillary (4). The time when the pulse generator (13) starts supplying the charging current of the Marx-generator (7) to the capacitor (1) is assigned by $t_0$. Using this notation the pre-ionizing discharge happens 2 µs earlier than $t_0$—taking into account also the own characteristic delay of the system itself. Breakdown of the system is effected by the pulse generator (13) at maximum 1 Hz repetition rate. The laser source (16), which is started when a predetermined charging current value of the triggering circuit (14) is reached, is a Q-coupled laser source emitting radiation at 1064 nm wavelength in the IR spectral range. The optical system (18) focusing the radiation of the laser source (16) into the spark gap (3) had a focal length of approximately f=100. In the spark gap (3) accumulation of the charged particles occurs in the optimal, maximum energy state of the system. Simultaneously with the breakdown of the spark gap (3) a discharge is generated in the capillary (4). In this example diameter of the capillary (4) is about 3.2 mm, its length is approximately 450 mm. The capillary (4) contains continuously flowing Ar gas at a base pressure of 30-80 Pa. As a result of the method of the present invention a hot, dense active material is generated in the capillary (4) with ions in a highly ionized state and the active material reaching about 300 µm diameter. The time dependent behavior of the capillary current and the thus generated light pulse is shown in FIG. 3.

In the description and the above example only an exemplary embodiment of the present invention was shown without the intention of any limitation. For the skilled person it is obvious that parts of the apparatus (100) can be replaced by other elements having the same function, and being also included in the scope of the present invention. For instance, the Marx-generator shown in the preferred embodiment can be replaced with another known generator used in the relevant technical field.

The invention claimed is:

1. Apparatus for laser-triggered driving of a soft x-ray laser, the apparatus containing a generator (7), a spark gap (3) a capillary (4), an energy storing capacitor (1) having capacitor faces (1a, 1b) and a laser source (16) being arranged off-axis with the capillary (4) and emitting laser radiation into the spark gap (3), characterized in that the spark gap (3) is placed in a fluid environment and the apparatus contains a current transformer (12) for transforming the current supplied by the charged energy storage capacitor (1) to a given measurement range, a triggering circuit (14) for measuring the transformed current and generating a triggering signal for the laser source (16) inducing excess charged particles in the spark gap (3), a signal delaying unit (15) for delaying the starting signal emitted by the triggering circuit (14) and an optical system (18) for focusing the laser pulses of the laser source (16) to at least one point of the spark gap (3).

2. Apparatus according to claim 1, characterized in that the laser radiation emitted by the laser source (16) is focused either to one of the electrodes or to a certain point of the fluid filled space between the two electrodes.

3. Apparatus according to claim 1, characterized in that the laser radiation emitted by the laser source (16) is focused either to both electrodes or to one of the electrodes and to a certain point of the fluid filled space between the two electrodes.

4. Apparatus according to claim 1, characterized in that it contains an optical fiber (17) leading the radiation of the laser source (16) to the optical system (18).

5. Apparatus according to claim 1, characterized in that the circuit containing the capillary (4), the laser triggered spark gap (3) and the energy storage capacitor (1) is arranged as a cylindrical waveguide (2) having a predetermined length and frequency depending on the operating voltage of the apparatus.

6. Method for laser-triggered driving of a soft x-ray laser containing the steps of:
   a) filling an energy storage capacitor (1) with fluid,
   b) charging the energy storage capacitor (1) to high voltage with the aid of a generator (7),
   c) inducing pre-ionization in a spark gap (3) attached to the energy storage capacitor (1),
   d) transforming the charging current of the energy storage capacitor (1) to a given measurement range by means of a current transformer (12),
   e) continuously measuring the transformed current,
   f) when a predetermined current value is reached a triggering signal is initiated, and the signal is transferred to the laser source (16) by predetermined delay,
   g) when the signal is captured at the laser source (16) a laser pulse is generated and the pulse is transferred into the spark gap (3) while the laser radiation is focused to at least one point of the spark gap (3).

7. Method according to claim 6, characterized in that the laser radiation emitted by the laser source (16) is focused either to one of the electrodes or to a certain point of the fluid filled space between the two electrodes.

8. Method according to claim 6, characterized in that the laser radiation emitted by the laser source (16) is focused either to both electrodes or to one of the electrodes and to a certain point of the fluid filled space between the two electrodes.

9. Method according to claim 8, characterized in that when the laser beams are focused into two different points of the spark gap (3), they are applied to the spark gap (3) at the same time or with a predetermined delay with respect to each other.

* * * * *